No. 11.907. Reissued May 7, 1901.

J. E. KENNEDY.

WARDROBE.

(Application filed May 31, 1900.)

2 Sheets—Sheet 1.

Witnesses.
W. C. Linsford
Edward H. Allen.

Inventor,
John E. Kennedy,
by Crosby & Gregory.
Atty's

No. 11,907. Reissued May 7, 1901.

J. E. KENNEDY.

WARDROBE.

(Application filed May 31, 1900.)

2 Sheets—Sheet 2.

Witnesses:
W. C. Lunsford.
Edward H. Allen.

Inventor:
John E. Kennedy,
by Crosby & Gregory.
Attys.

UNITED STATES PATENT OFFICE.

JOHN E. KENNEDY, OF BOSTON, MASSACHUSETTS.

WARDROBE.

SPECIFICATION forming part of Reissued Letters Patent No. 11,907, dated May 7, 1901.

Original No. 631,525, dated August 22, 1899. Application for reissue filed May 31, 1900. Serial No. 18,640.

*To all whom it may concern:*

Be it known that I, JOHN E. KENNEDY, a subject of the Queen of Great Britain, residing in Boston, Massachusetts, have invented certain new and useful Improvements in Wardrobes, of which the following is a specification.

My invention relates to improvements in wardrobes; and the object of the invention is to design a form of wardrobe more particularly applicable for stores for ready-made garments, whereby storage-space may be economized, classification of size and price facilitated, and time saved in selling and handling the goods; and it consists, essentially, of a wardrobe each section of which is provided with extensible supports or hanging devices, comprising each a plurality or set of members, preferably tubes or rods, the uppermost member of each set being mounted upon or carried by the frame of the wardrobe, and the lower members being suspended by suitable carriers from the said upper member.

Figure 1:
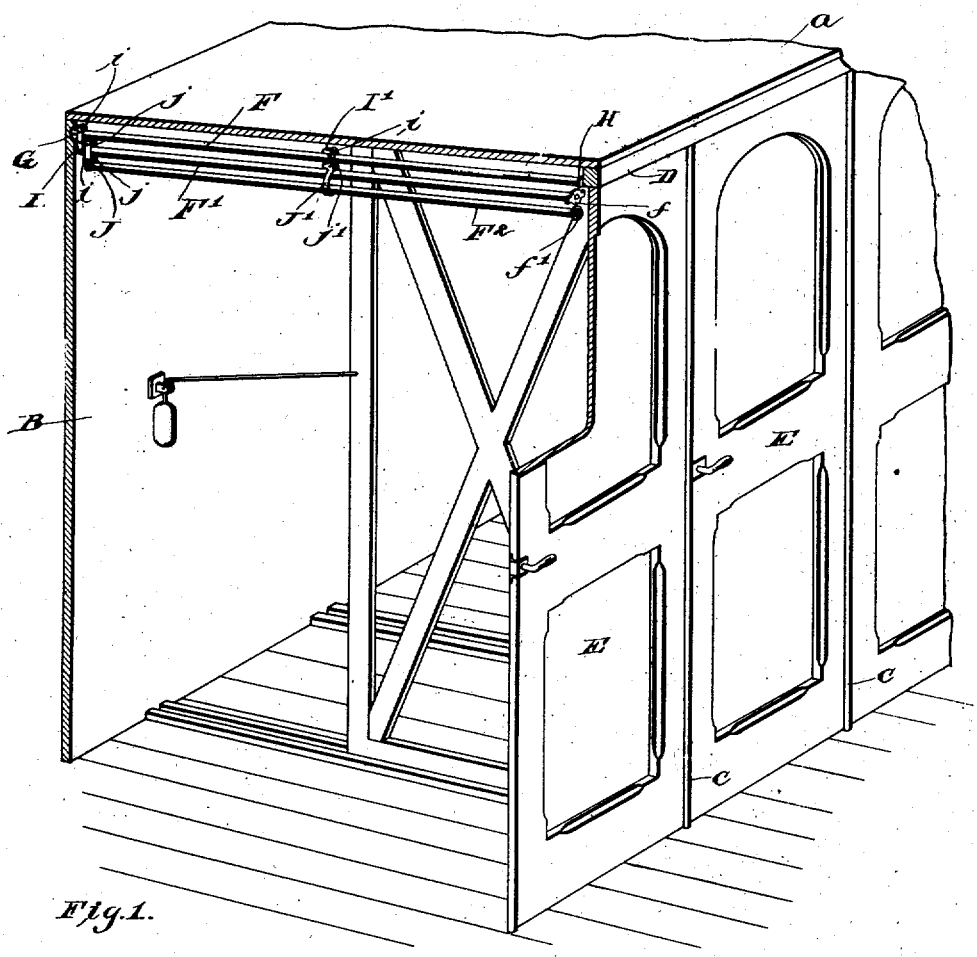
Figure 3:
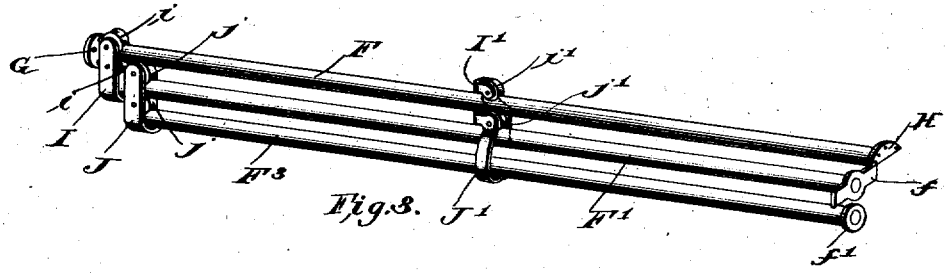
Figure 2:
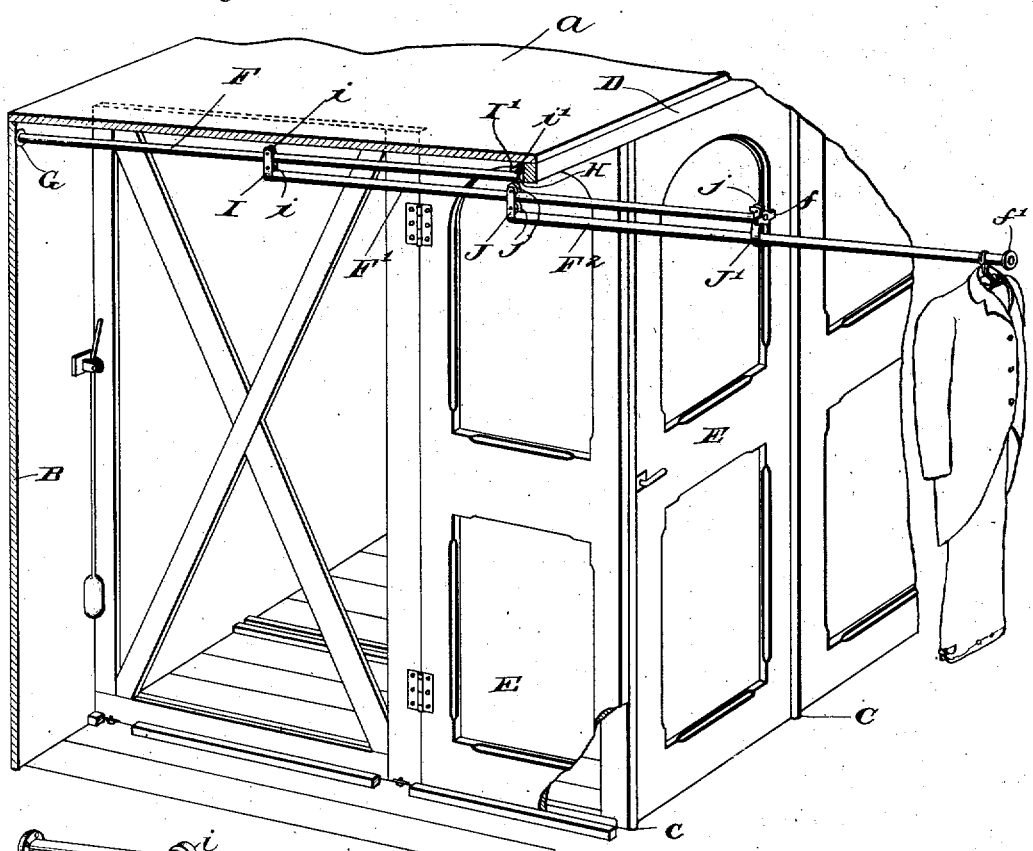
Figure 4:
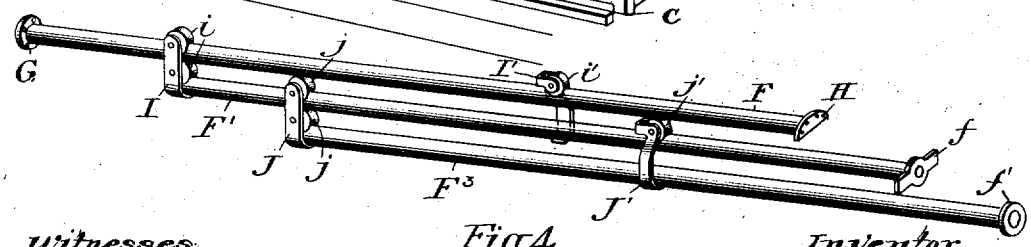

Figure 1 is a sectional perspective view of a portion of a wardrobe-case constructed in accordance with my invention, showing one of the extensible hanging devices in position in the wardrobe and the door closed. Fig. 2 is a similar view showing the door open and the extensible devices drawn forth. Fig. 3 is an enlarged perspective view of one of the extensible hanging devices detached, and Fig. 4 is a similar view showing the extensible device as partly extended or drawn out.

In the drawings like letters of reference indicate corresponding parts in each figure.

A is the top of the wardrobe, B the back, and C the front upright separating the doors of the wardrobe.

D is the front top board, and E the door.

I have herein shown the extensible support or hanging device as comprising an elongated main supporting member F, preferably made as a tube or rod, and a plurality of longitudinally-movable auxiliary members supported by and below the main member, as F′ F². The main member F is supported on the back B by the bracket G and on the top front board by the bracket H, said brackets being suitably attached to member F. The auxiliary member F′, shown as situated next below the fixed member F, is suspended therefrom and sustained thereby by upturned carrier-brackets I I′, brazed or otherwise connected to the member F′ at its inner end and intermediately of its length, respectively, as clearly illustrated in Figs. 3 and 4. The end bracket is provided with means to counteract the upward thrust of the adjacent end of its attached member, and herein the bracket I is shown as provided with grooved rollers *i i*, journaled therein above and below the member F to engage therewith, the bracket I′ having a single grooved roller *i′* resting on the member F. The third or undermost member F² of the set or series is similarly provided at its inner end and intermediately of its length with upturned carrier-brackets J J′, respectively, suitably secured at their lower ends to the member F². Suitable rollers *j* are journaled in the bracket J to engage and run upon the top and bottom of the intermediate member F′, while the bracket J′ has a single grooved roller *j′* to travel upon the top of the member F′, which latter is shown as provided at its outer end with a stop-collar and handle *f*, a stop-collar *f′* being secured to the outer end of the member or rod F².

It will be noticed on reference to Fig. 2 that when the device is extended the bracket I′ and its roller are stopped by the bracket H and the bracket J′ and roller of the member F² are stopped by the stop-collar *f*, so that when the auxiliary tubular or rod-like members are drawn out longitudinally to their fullest extent the major portion of the member F² is entirely outside the compartment of the wardrobe. Such lowermost member F² is designed to receive and hold suitable garment-supporters, from which a number of garments may be hung. It will be manifest that the entire capacity of the member F² can be utilized for such hangers and that the latter will be wholly within the wardrobe-compartment when the supporting device is pushed in and exposed to examination outside of the wardrobe when the device is extended.

The several tubes or rods composing each set are located substantially in the same vertical plane one below another, each member being suspended from the member next above it.

When the members are drawn out, as in

Fig. 2, it will be manifest that the roll $j'$ is the fulcrum of the member $F^2$, and the load supported thereby will tend to force the inner end of said member upward. This thrust is resisted by the lower roller $j$, which bears against the under side of member $F'$, and the upward thrust of the inner end of this member is in turn counteracted or resisted by the lower roller $i$ bearing against the under side of the fixedly-positioned main member F.

Having fully described my invention, what I claim, and desire to secure by Letters Patent, is—

1. The combination with the wardrobe, of a tube or rod having fixed supports in the frame of the wardrobe above the level of the door or opening, a second tube supported by the fixed tube and having the outer end free, and suspended at the inner end and intermediately of its length from the fixed tube by upturned brackets, so that said second tube may be slid out approximately half its length beyond the outer end of the fixed tube, and a third tube suspended from the second tube and having its outer end free, and supports at its inner end and intermediate of its length, coöperating with the second tube, whereby the third tube may be slid out approximately its entire length beyond the outer end of the fixed tube and the front of the wardrobe.

2. In an apparatus of the class described, an elongated main supporting member fixedly sustained at its ends, a plurality of longitudinally-movable auxiliary members supported by and below the main member, each auxiliary member having attached to it at its inner end, and intermediately of its length, respectively, upturned brackets to engage and travel upon the member next above it, and means carried by each of said end brackets to counteract upward thrust of the adjacent end of its attached member, said auxiliary members being longitudinally movable relative to the main member and to each other.

3. In an apparatus of the class described, a main supporting rod or tube fixedly sustained at its ends, a plurality of longitudinally-movable auxiliary rods or tubes supported by and below the main rod, each auxiliary rod or tube having attached thereto upturned brackets at its inner end and intermediately of its length, respectively, to engage and travel upon the rod or tube next above it, and means carried by each of said end brackets to counteract upward thrust of the adjacent end of its attached rod and to transmit such thrust to the rod next above it, said auxiliary rods or tubes being longitudinally movable relative to the main rod or tube and to each other.

4. In an apparatus of the class described, a main supporting rod or tube fixedly sustained at its ends, a plurality of longitudinally-movable auxiliary rods or tubes supported by and below the main rod, each auxiliary rod or tube having attached thereto upturned brackets at its inner end and intermediately of its length, respectively, to engage and travel upon the rod or tube next above it, a pair of rollers mounted on each end bracket, to engage and travel upon the upper and lower portions of the tube or rod next above, the lower roll of each pair counteracting upward thrust of the adjacent end of the tube or rod to which its bracket is attached, and a roll mounted on each intermediate bracket, to travel upon the upper side of the tube or rod next above, said auxiliary rods or tubes being movable longitudinally relative to the main rod or tube and to each other.

5. In an apparatus of the class described, an elongated main supporting member fixedly sustained at its ends, a plurality of longitudinally-movable auxiliary members supported by and below the main member, each auxiliary member having attached to it at its inner end, and intermediately of its length, respectively, upturned brackets to engage and travel upon the member next above it, means carried by each of said end brackets to counteract upward thrust of the adjacent end of its attached member, said auxiliary members being longitudinally movable relative to the main member and to each other, a stop on the outer end of the main supporting member for the intermediate bracket of the auxiliary member next below, and a stop on the outer end of said latter member for the intermediate bracket on the lowermost auxiliary member.

6. In an apparatus of the class described, a main supporting rod or tube fixedly sustained at its ends, a plurality of longitudinally-movable auxiliary rods or tubes supported by and below the main rod, each auxiliary rod or tube having attached thereto upturned brackets at its inner end and intermediately of its length, respectively, to engage and travel upon the rod or tube next above it, and means carried by each of said end brackets to counteract upward thrust of the adjacent end of its attached rod and to transmit such thrust to the rod next above it, said auxiliary rods or tubes being longitudinally movable relative to the main rod or tube and to each other, the several rods or tubes being located one below the other in substantially the same vertical plane, the longitudinal movements of the auxiliary rods or tubes being effected in such vertical plane.

In testimony whereof I have signed my name to this specification in the presence of two subscribing witnesses.

JOHN E. KENNEDY.

Witnesses:
DAVID D. PILLER,
H. STORER BARRY.